A. A. MEAD.
VENTILATOR FOR VEHICLES AND THE LIKE.
APPLICATION FILED AUG. 26, 1916.

1,250,927.

Patented Dec. 18, 1917.

Inventor.
Albert Alfred Mead,
By [signature] atty

UNITED STATES PATENT OFFICE.

ALBERT ALFRED MEAD, OF LEE, ENGLAND.

VENTILATOR FOR VEHICLES AND THE LIKE.

1,250,927. Specification of Letters Patent. Patented Dec. 18, 1917.

Application filed August 26, 1916. Serial No. 117,056.

*To all whom it may concern:*

Be it known that I, ALBERT ALFRED MEAD, a subject of the King of Great Britain and Ireland, residing at 1 Handen road, Lee, in the county of Kent, England, have invented certain new and useful Improvements in Ventilators for Vehicles and the like, of which the following is a specification.

This invention comprises improvements in ventilators for vehicles and the like, and particularly vehicles intended for the conveyance of passengers, as for example, motor propelled carriages and cars, and railway and tramway vehicles.

One object of this invention is to provide a simple construction which cannot easily be put out of order or damaged and which operates to extract air from the compartment or space of the vehicle, owing to the movement of the latter through the atmosphere.

A further object is to provide apparatus of this description capable of extracting a considerable amount of air, and nevertheless occupying little space and projecting to a very limited extent beyond the surface upon which such apparatus is fixed.

Another object is to provide a ventilator through which it is impossible for cinders, dirt or rain to penetrate into the compartment or space from which the air is extracted.

Yet another object is to provide an efficient ventilator which is not costly to produce and in which there is a complete absence of moving parts so that it is noiseless and will last for a long time without renewal or attention.

According to the invention the ventilator comprises an open ended bonnet, the width of which is small compared with the depth, the said bonnet inclosing or covering sloping surfaces mounted on a back plate or base, and said sloping surfaces extending from respective ends of the ventilator, or the neighborhood of such ends, to an extraction opening situated at that part of the bonnet where the through passage from end to end is smallest owing to the disposition of said surfaces.

The depth of the sloping surfaces is advantageously less than the depth of the bonnet and the said surfaces are preferably arranged with their top and bottom edges spaced from the top and bottom respectively of the bonnet, so as to produce top and bottom passages or spaces in the bonnet which are not of decreasing cross-sectional area at an intermediate point.

Means are provided for guarding against the entry of cinders, dirt and moisture through the extraction opening and the openings formed by the disposition of the sloping surfaces.

The accompanying drawing illustrates one embodiment of this invention, and therein:—

Figure 1:
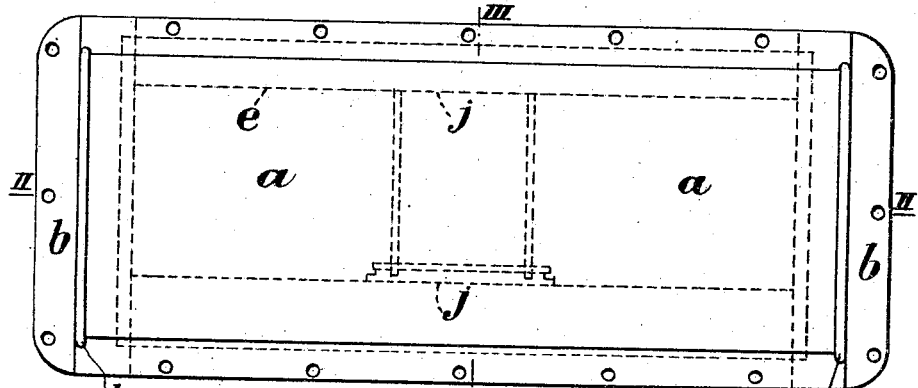
Figure 1 is an elevation of the exterior of an improved ventilator.
Figure 2:
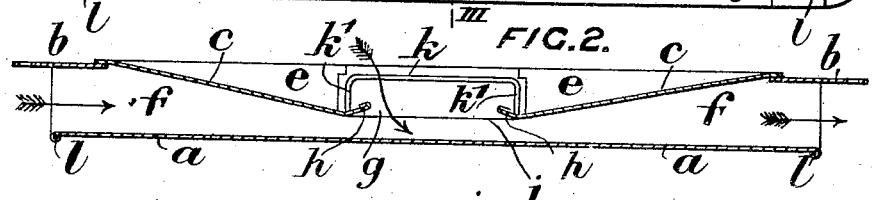
Fig. 2 is a longitudinal transverse section on the line II—II of Fig. 1.
Figure 3:
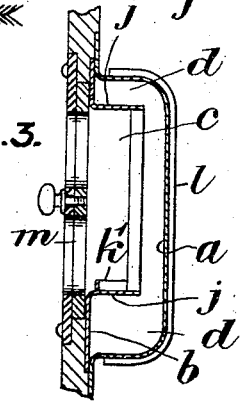
Fig. 3 is a vertical section on the line III—III of Fig. 1, but showing the ventilator applied to a carriage door for use in combination with a hit-and-miss slide.
Figure 4:
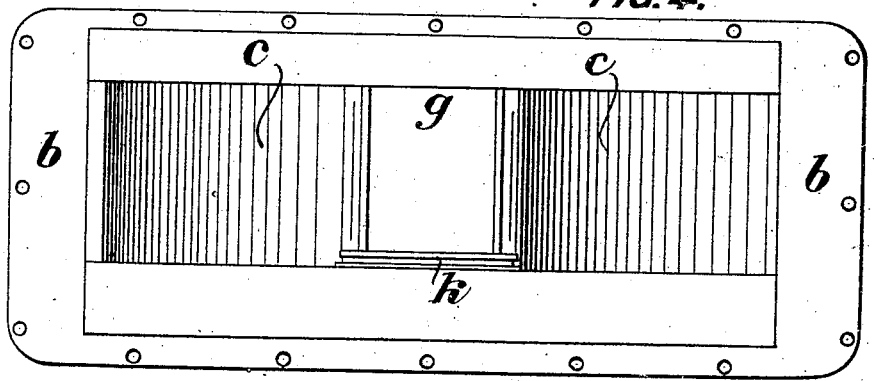
Fig. 4 is an elevation of the inner side of the ventilator.

Referring to the drawings, the ventilator comprises a bonnet or casing $a$ which is adapted to be secured by the back plate or base $b$ to the door or side of a carriage or the like over an aperture formed therein the plate $b$ being also formed with a suitable aperture as shown. The bonnet $a$ is open at each end but is completely closed at the side, top and bottom as seen clearly in Fig. 3. The width of the bonnet is small compared with the depth from top to bottom. For example, the width may be one and a half inches while the depth may be nearly seven inches. Within the bonnet or casing and on the back plate $b$ are fitted two sloping surfaces $c$ which extend from near respective ends of the bonnet to points not far from the center thereof. These surfaces are preferably not so deep as the bonnet $a$ and are arranged so as to leave a space $d$ above and below them in the bonnet $a$. The openings above and below the inclined surfaces $c$ are closed by horizontal surfaces $e$ joining the inclined surfaces with the back plate $b$, upon which the bonnet $a$ is mounted. Therefore from each end of the bonnet toward the middle, the passage or throughway $f$, Fig. 2, gradually decreases in width until the opening $g$ between the inner ends of the sloping surfaces $c$ is reached. As the vehicle moves along in one direction or the other, as for example in the direction of the large arrow Fig. 2, air enters one end of the bonnet, as indicated by the small arrows, and its velocity increases as it approaches the middle and is greatest as it flows past the opening

*g* between the inner ends of the two surfaces *c*. A reduction of pressure consequently takes place at this point so that a current of air is induced to flow from the compartment or space out of the opening *g* into the stream of air in the bonnet *a* as indicated by the sinuous arrow in Fig. 2.

The bonnet *a* may be eighteen inches from end to end and the sloping surfaces *c* may commence a little way within, as shown, and each surface may be six and a half inches in length and an opening *g* of three inches may be left between the inner ends of the surfaces *c*. The edge portions *h* Fig. 2 of the inner ends may be turned inwardly away from the bonnet *a*, or may be otherwise formed or bent so as to avoid offering any edge or projection for the high velocity stream of air in the passage *f* to strike against, it being important not to interfere with the formation of the air current or stream at this point. The dimensions given above are merely mentioned as suitable examples in order to make clear the character of the surfaces which are employed and their disposition in the passage-way of the bonnet. The principal consideration is to construct and arrange the inclined surfaces *c* and the bonnet *a* so that the velocity of the air current is gradually increased and so that the action due to this current is not interfered with either by outside influences such as side winds or eddies, or by internal objects such as edges or projections. In a ventilator such as that described above, the extraction opening *g* is at such a distance within the bonnet *a* that it is impossible for side winds or pressure to cause air to pass through the opening *g* into the carriage, and the nature of the passage *f* is such that it is practically impossible for particles of cinder or other objectionable matter to strike a surface and be deflected inwardly through the opening *g* into the compartment or space within the carriage.

The opening may be guarded above and below by horizontal plates *j* which may be continuations or parts of the plates *e* aforesaid, and in order to prevent moisture, which may be carried into the ventilator and deposited upon the surfaces thereof, from collecting and running through the opening *g* into the compartment, the lower guard plate may be formed upon its upper surface with an upstanding lip or ridge, preferably comprising two lateral portions *k'* which extend inwardly from the inner ends of the inclined surfaces, and a longitudinal portion *k* parallel with the opening *g* and joining the lateral portions *k'*. Therefore any moisture collecting and running down on to the lower guard plate cannot pass into the carriage and will run off the said plate into the bonnet or casing where it will be removed by the air current.

The invention avoids the necessity for making the bonnet with sharply flared or trumpet shaped ends, so that the device is not unsightly and projects but little laterally beyond the side of the carriage.

The improved ventilator can be substituted for or fitted in the place usually occupied by ordinary carriage door ventilators. Moreover, it may be used in combination with the ordinary hit-and-miss slide device such as *m*, Fig. 3, usually arranged on the interior surface of the door or with a hinged flap window or any other suitable closing device.

The provision against entry of cinder, dirt or objectionable matter is so effective that the use of gauze, baffles, or other filtering or arresting devices is generally unnecessary. However, for use in some atmospheres it may be advisable to fit perforated metal or gauze over or behind the extraction opening *g*.

The end edges of the bonnet or casing *a* may be beaded or rolled as at *l*.

The present invention secures a maximum ventilating effect with a device which projects to a minimum extent beyond the surface of the carriage or vehicle upon which it is mounted, and renders practically impossible any ingress of air or objectionable matter through the extraction opening.

What I claim is:—

1. A vehicle ventilator comprising a back plate, air deflective plates longitudinally arranged thereon, said plates making an acute angle with said back plate, an extraction opening being situated between the inner ends of said plates, and a flat open ended tubular structure on said back plate and covering said deflector plates, a longitudinal edge portion of said flat tubular structure extending laterally beyond a longitudinal edge of said plates, substantially as set forth.

2. A vehicle ventilator comprising a flat tubular structure, a back plate upon which the latter is mounted, deflector plates of less width than said structure longitudinally arranged on said back plate and within said structure, said plates making an acute angle with said back plate, and an extraction opening situated between the inner ends of said deflector plates, substantially as set forth.

3. A vehicle ventilator comprising a back plate, air deflector plates longitudinally arranged thereon and forming an acute angle with said back plate, an extraction opening situated between the inner ends of said plates, lateral cover plates closing the angular openings between the longitudinal edges of said plates and said back plate, and a flat open ended tubular structure on said back plate and covering said deflector plates, the longitudinal edge portions of said structure extending beyond the longitudinal edges of said plates, substantially as set forth.

4. A vehicle ventilator comprising a back plate, air deflective plates longitudinally arranged thereon and forming an acute angle with said back plate, an extraction opening situated between the inner ends of said plates, lateral cover plates closing the angular openings between the longitudinal edges of said deflective plates and the back plate, guard means on one of said cover plates adapted to prevent entry of water into the compartment from the ventilator, and a flat open-ended tubular structure on said back plate and covering said deflector plates, the longitudinal edge portions of said structure extending beyond the longitudinal edges of said plates, substantially as set forth.

ALBERT ALFRED MEAD.

Copies of this patent may be obtained for five cents each, by addressing the "Commissioner of Patents, Washington, D. C."